(12) United States Patent
Yamada et al.

(10) Patent No.: US 6,708,718 B2
(45) Date of Patent: Mar. 23, 2004

(54) HIGH PRESSURE GAS SUPPLYING SYSTEM

(75) Inventors: Akira Yamada, Saitama (JP); Akifumi Otaka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 78 days.

(21) Appl. No.: 10/038,871

(22) Filed: Jan. 8, 2002

(65) Prior Publication Data

US 2002/0096212 A1 Jul. 25, 2002

(30) Foreign Application Priority Data

Jan. 9, 2001 (JP) ........................................ 2001-001250

(51) Int. Cl.[7] ................................................. G05D 7/00
(52) U.S. Cl. ........................ 137/255; 137/263; 137/266
(58) Field of Search .................................. 137/255, 256, 137/263, 265, 266; 62/45.1, 50.7, 50.1

(56) References Cited

U.S. PATENT DOCUMENTS

| | | | | |
|---|---|---|---|---|
| 3,982,399 A | * | 9/1976 | Rookey | 137/255 |
| 4,045,180 A | * | 8/1977 | Young et al. | 137/266 |
| 5,704,387 A | * | 1/1998 | Sims | 137/263 |
| 5,992,219 A | * | 11/1999 | Otaka | 73/40.5 R |
| 6,089,252 A | * | 7/2000 | Braun | 137/263 |
| 6,371,145 B1 | * | 4/2002 | Bardon | 137/1 |

* cited by examiner

Primary Examiner—Kevin Lee
(74) Attorney, Agent, or Firm—Armstrong, Kratz, Quintos, Hanson & Brooks, LLP

(57) ABSTRACT

A high pressure gas supplying system comprises a supplying line 4 for supplying high pressure gas from high pressure tanks 3a, 3b. The supplying line 4 includes a supply piping line 30 connected with the high pressure tank 3a, a supply piping line 31 connected with the high pressure tank 3b, and a piping joint section 32 connecting these supply piping lines 30 and 31. A check valve 34a is provided in the supply piping line 30 to establish a flowing passage on condition that the internal pressure of the high pressure tank 3a is higher than the pressure at the piping joint section 32. And a check valve 34b is provided in the supply piping line 31 to establish a flowing passage on condition that the internal pressure of the high pressure tank 3b is higher than the pressure at the piping joint section 32.

3 Claims, 4 Drawing Sheets

HIGH PRESSURE GAS SUPPLYING SYSTEM

FIELD OF THE INVENTION

The present invention relates to a high pressure gas supplying system for supplying, for example, a fuel cell with high pressure gas stored in high pressure tanks.

BACKGROUND OF THE INVENTION

In recent years, fuel cell powered electric vehicles have been drawn attention from a viewpoint of environmental protection, such as for restricting an emission amount of carbon dioxide, which causes the global warming. The fuel cell powered electric vehicle is furnished with a fuel cell generating electricity by way of electrochemically reacting hydrogen with oxygen that is contained in the air so that electricity generated by the fuel cell is supplied to the motor to generate a driving force. The hydrogen utilized for the fuel cell powered electric vehicle is of gaseous type because of its simple handling compared with the liquid type hydrogen, and a high pressure tank or high pressure gas storage tank is employed as a storage means. Hydrogen powered vehicles have also been drawn attention from the environmental point of view. The hydrogen powered vehicle is equipped with an internal combustion engine for burning hydrogen gas instead of gasoline. The hydrogen powered vehicle is also furnished with a high pressure tank for the same reason as mentioned above.

For the purpose of decreasing the weight, the high pressure tank is mainly made of the plastic, such as polyethylene, and is reinforced by fibers to ensure sufficient withstand pressure. When hydrogen gas is used and the high pressure tank is emptied, the high pressure tank is refilled with hydrogen gas from a hydrogen gas supplying source provided at a hydrogen gas station like a petrol station. The fuel cell powered electric vehicle carries a plurality of high pressure tanks, and selectively or simultaneously, hydrogen gas is supplied to the fuel cell from each tank.

As a known example of the high pressure gas supplying system, Japanese Laid-open Patent Publication No. Hei-8-177641 discloses a high pressure gas supplying system, from which high pressure gas is supplied to a fuel cell and to which high pressure gas is filled.

This high pressure gas supplying system includes a supplying line for supplying the fuel cell with high pressure gas from two high pressure tanks, and a filling line for filling the high pressure tanks with high pressure gas. And the main structural pets of the supplying line and the filling line are shared. The supplying line and the filling line are substantially the same in constitution, except for the constitution in the proximity of the high pressure tanks, where the filling line has a piping line provided with a check valve and the supplying line has a piping line provided with a switch valve. Further, these piping lines are arranged in parallel such that the supply of the high pressure gas from the high pressure tanks to the fuel cell is controlled by the switch valve and the filling of the high pressure gas into the high pressure tanks is controlled by the check valve. According to this high pressure gas supplying system, the check valve prevents a counterflow of the high pressure gas filled in the high pressure tanks into the common part shared by the supplying line and the filling line. Since the piping line with the check valve and the piping line with the switch valve are joined into one piping and connected to the high pressure tank, each high pressure tank has only one connecting opening.

However, in such a high pressure gas supplying system, when these switch valves are released with the internal pressure of one high pressure tank being higher and the internal pressure of the other high pressure tank being extremely lower, the high pressure gas stored in the high pressure tank and having higher internal pressure often counterflows rapidly through the piping and the switch valve into the high pressure tank having lower internal pressure. In this instance, when the high pressure gas contains a lot of hydrogen, heat is generated mainly due to adiabatic compression of the hydrogen gas. Also, due to expansion explained by Joule-Thomson effect, heat is generated. Accordingly, when high pressure hydrogen gas counterflows rapidly into the high pressure tank with smaller internal pressure, the temperature in the high pressure tank rises rapidly. As a result, the high pressure tank and equipment thereof are often damaged. Herein, Joule-Thomson effect explains temperature change of a gas upon adiabatic irreversible expansion of the gas. Adiabatic irreversible expansion of the hydrogen gas becomes an exothermic reaction factor under the ordinary temperature.

As mentioned above, if there is a difference in internal pressure, even it the switch valve is closed at the high pressure tank with lower internal pressure, the check valve opens as in the case of filling high pressure gas. Therefore, there is a possibility that the high pressure gas with higher pressure counterflows into the high pressure tank with lower internal pressure.

Accordingly, the object of the present invention is to provide a high pressure gas supplying system wherein even if there is a pressure difference between a plurality of high pressure tanks to be filled with a high pressure gas mainly composed of hydrogen gas, a counterflow of the high pressure gas from a high pressure tank with higher internal pressure to a high pressure tank with lower internal pressure can be prevented, and hence an unnecessary temperature increase of the high pressure tank can be prevented.

SUMMARY OF THE INVENTION

According to the present invention, there is provided a high pressure gas supplying system including:
- a plurality of high pressure tanks for filling high pressure gas;
- a supplying line for supplying the high pressure gas from the high pressure tanks: and
- a switch valve for controlling open/close of each high pressure tank.
- wherein the supplying line comprises a plurality of supply piping lines each connected to the high pressure tank, a piping joint section connecting these supply piping lines, and a counterflow preventing section for preventing a counterflow of the high pressure gas from the piping joint section to each high pressure tank.

In this the high pressure gas supplying system, since a counterflow preventing section is provided, the high pressure gas supplied from each high pressure tank can be flown in a certain direction. Therefore, even if there is a pressure difference between high pressure gases filled in the respective as high pressure tanks, it is possible to prevent a counterflow of the high pressure gas having higher pressure into the high pressure tank with lower internal pressure via the piping joint section. Accordingly, since the high pressure gas mainly composed of hydrogen gas does not counterflow into the high pressure tank with lower internal pressure during the supply off the high pressure gas, rapid increase of the high pressure and the high pressure tank can be prevented.

In the aforementioned high pressure gas supplying system, the counterflow preventing section may be formed by a check valve provided either between the piping joint section and each high pressure tank or at each high pressure tank.

Since a check valve has a structure allowing a flow of gas in one direction only, providing a check valve between the piping joint section and the high pressure tank can reliably stop a flow of the high pressure gas counterflowing in the supplying line irrespective of a pressure difference of the high pressure gas in the respective high pressure tanks. Also, the above effect can be achieved if a check valve is provided at a plug of each high pressure tank.

Further, in the aforementioned high pressure gas supplying system, the counter flow preventing section may be formed by a three way valve provided at the piping joint section.

A three way valve has three ports connectable to piping lines and a connection is made with respect to one particular joint by selecting one port from the other two remaining ports. If a three way valve is provided at the piping joint section, for example, one piping line is selected from two piping lines connected to two high pressure tanks among a plurality of high pressure tanks and is connected to the remaining one piping line. Therefore since the non-selected piping line is shut off from the flow of the high pressure gas, the high pressure gas does not counterflow into the non-selected piping line. When necessary, by the combination of such three way valves, it is possible to select a high pressure gas supplying line from two or more high pressure tanks.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENTS

Figure 1:
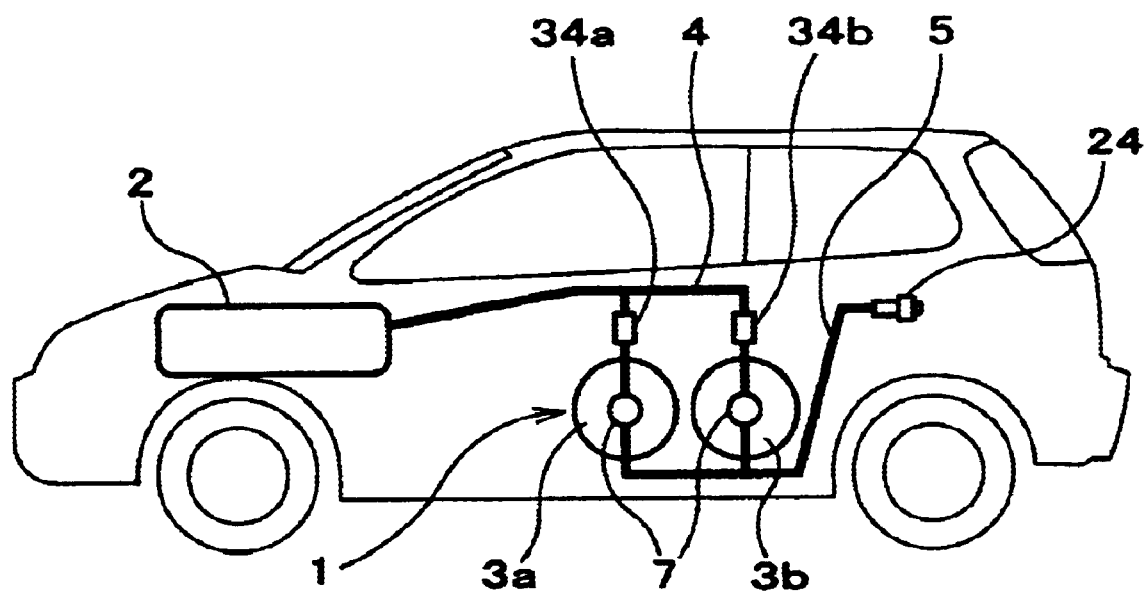
FIG. 1 is a schematic view illlustrating a fuel cell powered electric vehicle an which a high pressure gag supplying system according to the present invention is mounted

With reference to the attached drawings, preferred embodiments of the present invention will be described, As shown in FIG. 1, a high pressure gas supplying system 1 is mounted on a fuel cell powered electric vehicle (hereinafter referred to as a vehicle) furnished with a fuel cell 2. The high pressure gas supplying system comprises two parallelly arranged high pressure tanks 3a, 3b to be filled with high pressure gas, a supplying line 4 for supplying high pressure gas from each high pressure tan 3a, 3b to a fuel cell 2, and a filling line 5 for filling these high pressure tanks 3a, 3b with high pressure gas.

In this preferred embodiment, high pressure gas refers to hydrogen gas or a gas containing a lot of hydrogen gas, and natural gas (CNG: Compressed Natural Gas) is also included.

The fuel cell 2 generates electricity by way of utilizing an electrochemical reaction between hydrogen supplied from the high pressure tanks 3a, 3b and oxygen extracted from the outside air, and rotates a non-shown motor. Instead of the fuel cell 2, an internal combustion engine burning hydrogen gas or natural gas may be employed.

Figure 2:
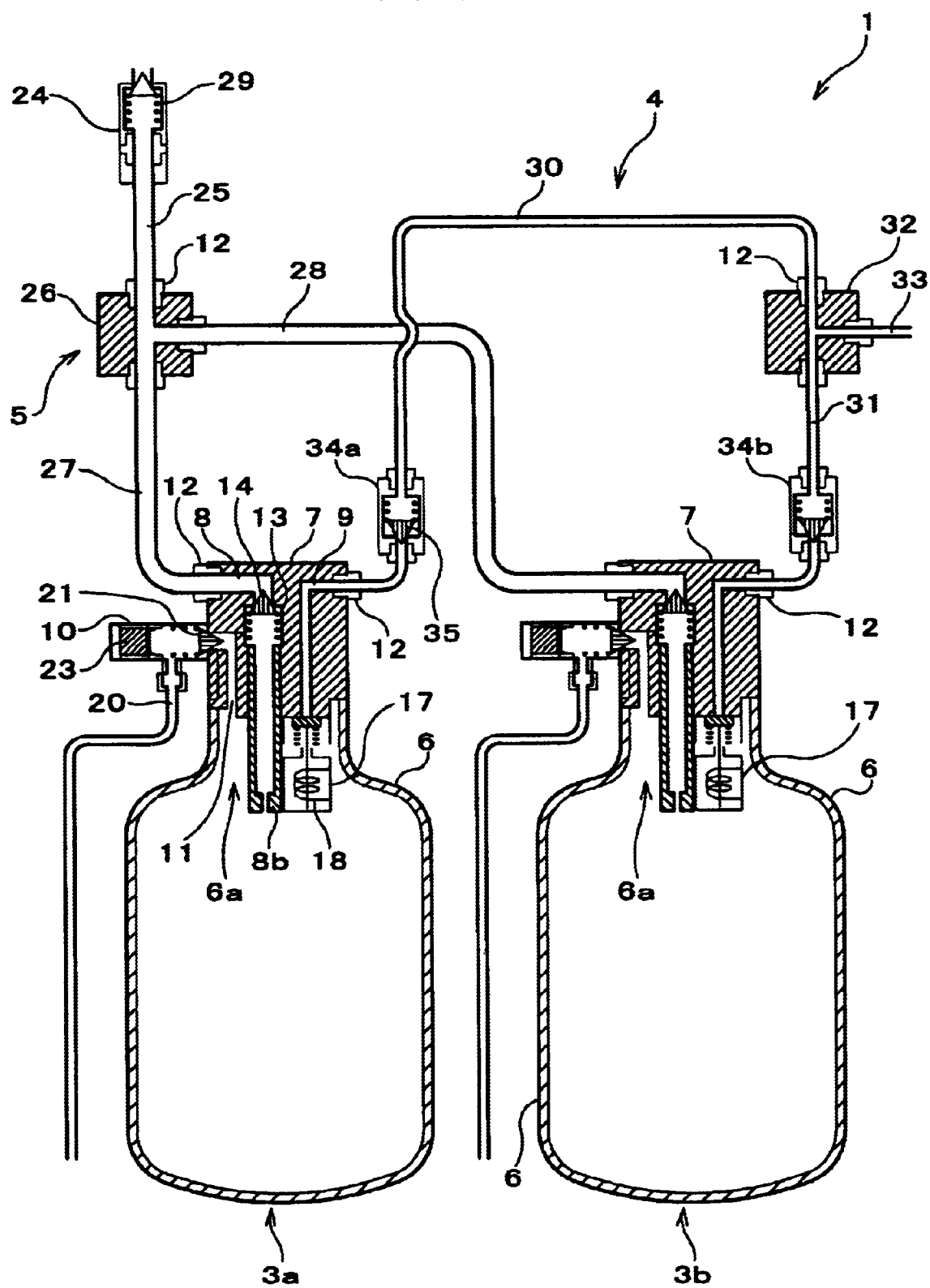
FIG. 2 shows a structure of the high pressure gas supplying system.
Figure 3:
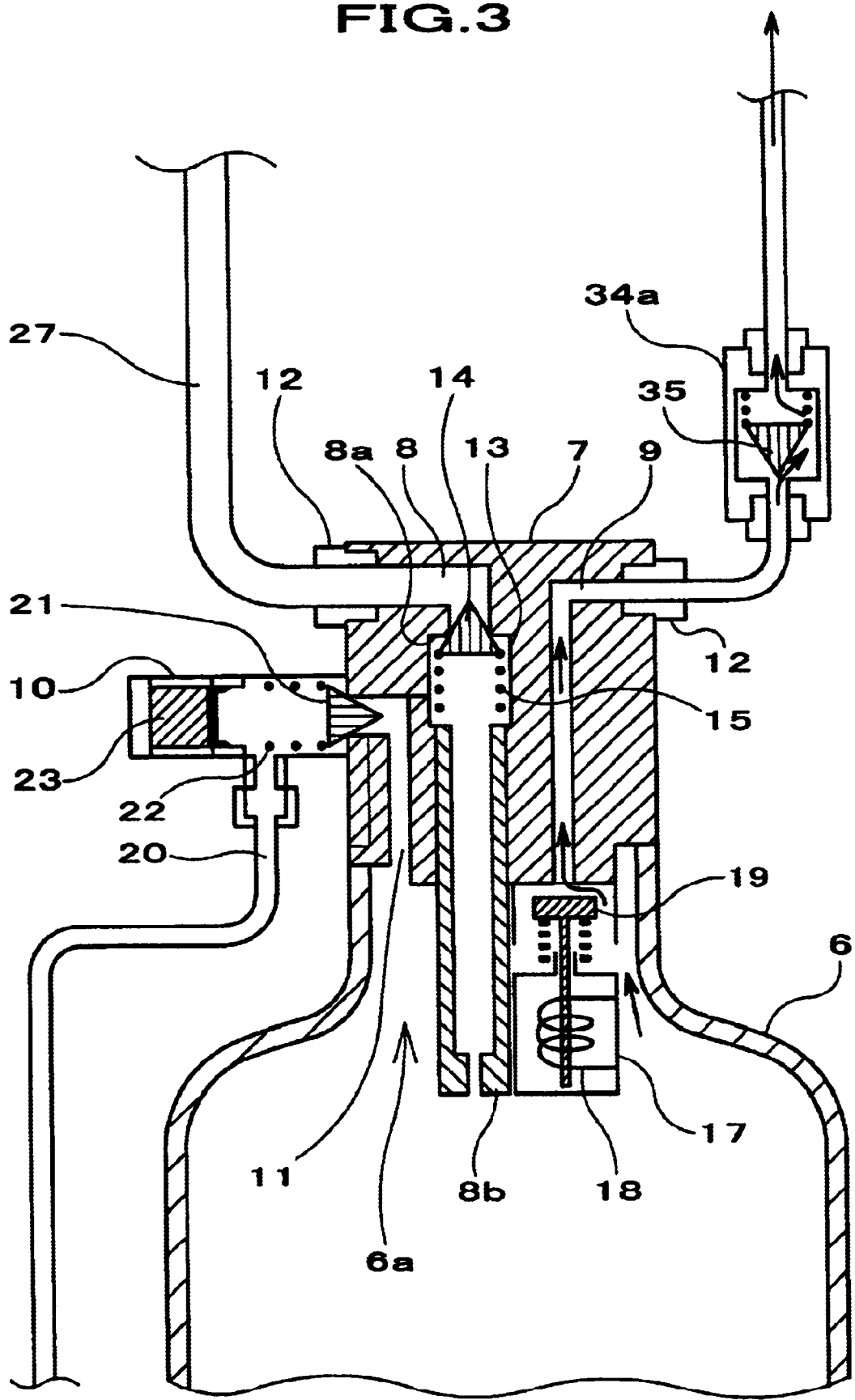
FIG. 3 is an enlarged view illustrating a plug of a high pressure tank.

With reference to FIGS. 2 and 3, each constitution element of the high pressure gas supplying system 1 will be described. FIG. 3 is a partly enlarged view of FIG. 2 and explains that the high pressure tank 3a is supplying high pressure gas.

As shown in FIG. 2, the high pressure gas supplying system 1 comprise two high pressure tanks 3a, 3b, a filling line 5 for filling the high pressure tanks 3a, 3b with high pressure gas, and a supplying line 4 for supplying the high pressure gas from the high pressure tanks 3a, 3b to the fuel cell 2. The supplying line 2 is provided with non-shown pressure gauges, and the pressure of the high pressure gas to be supplied to the fuel cell 2, viz. the amount of the gas retained in the respective high pressure tanks 3a, 3b, is monitored. The pressure gauge may be provided in the close proximity of the high pressure tank 3a, 3b in the supplying line 4 or in the filling line 5.

The high pressure tanks 3a and 3b are the same in construction. The high pressure tank 3a, 3b includes a main body 6 for accommodating high pressure gas over a long period of time, and a plug 7 for sealing an opening 6a of the main body 6. The high pressure tanks 3a, 3b may be made of a metallic material such as steel, however in terms of reducing the weight, so-called FRP (Fiber Reinforced Plastic) wherein a plastic material such as polyethylene is reinforced by fiber is preferable. The volume and the filling pressure of the high pressure tanks 3a, 3b may be determined for each vehicle Further, FIG. 2 shows two high pressure tanks 3a, 3b, however, more than three high pressure tanks may be employed.

As shown in FIGS. 2 and 3, the plug 7 is provided with a filling opening 8 for filling the high pressure tank 3a, 3b with high pressure gas, a supply opening 9 for drawing the high pressure gas from the high pressure tank 3a, 3b, and a relief opening 11 for connecting a safety valve 10, which releases the pressure within the high pressure tank 3 in the air when the temperature in the high pressure tank 3 rises over a certain value.

The filling opening 8 extends through the plug 7 and communicates the inside and the outside of the high pressure tank 3a, 3b. One end (outer side) of the filling opening 8 is connected to the filling line 5 via a joint 12, and a filling pipe 8b is inserted into the other end of the filling opening 8. The filling pipe 8b extends from the filling opening 8 to the inside of the high pressure tank 3a, 3b. The front end of the filling pipe 8b is reduced in its opening diameter. A check value 13 is provided in the space between the filling opening 8 and the filling pipe 8b to prevent a counterflow to the high pressure gas from the high pressure tank 3a, 3b to the filling line 5.

As best seen in FIG. 3, the check valve 13 is constituted such that a valve element 14 is urged by a spring 15 from the inside of the high pressure tank 3 toward a stepped portion 8a of the filling opening 8. Therefore, when the high pressure gas in the filling line 5 becomes greater for a certain pressure than the high pressure gas within the high pressure tank 3a, the valve element 14 moves in a downward direction of FIG. 3, allowing a flow of the high pressure gas from the filling line 5 to the high pressure tank 3a, 3b. Meanwhile, when the pressure difference between the pressure in the filling line 5 and the pressure in the high pressure tank 3a is smaller than the resilient force of the spring 15 to urge the valve element 14, since the valve element 14 abuts to the stepped portion 8a of the filling opening and is retained stationarily, a flow of the high pressure gas is shut off. In the following explanation, other check valves are substantially the same in construction and operation.

The supply opening 9 extends through the plug 7 and communicates the inside and the outside of the high pressure tank 3a, 3b. One outer end of the supply opening 9 is connected to the supplying line 4 via a joint 12. At the lower end of the supply opening 9 and within the high pressure tank 3a, 3b, an electromagnetically-operated shutoff valve 17 is provided as a switch valve. The shutoff valve 17 operates to open or close the supply opening 9 in such a manner that the valve element 19 is moved upwardly and downwardly of FIG. 2 by the solenoid coil 18. The solenoid valve 17 may be provided outside of the plug 7 or intermediately of the supplying line 4. Further, The electromagnetically-operated shutoff valve 17 may be formed by other known shutoff valve, however, in terms of shutting off the supply of the high pressure gas while the valve 17 is not operating, a so called normally closed type is preferable.

The safety valve 10 is provided outside of the relief opening 11. The safety valve 10 is connected to a piping line 20 for releasing the high pressure gas. As shown in FIG. 3, the safety valve 10 is constituted such that a valve element 21 is urged by a spring 22 toward the inside of the high pressure tank 3a, 3b and a fusible metal 23 is positioned at the other end of the spring 22. Since the fusible metal 23 has a lower melting point compared with the other members, when the temperature of the high pressure tank 3a, 3b rises to a high temperature, the fusible metal 23 melts first. Therefore, when the fusible metal 23 melts, the valve element 21 is pushed by the high pressure gas and the high pressure gas is released in the air from the piping line 20. This can prevent the internal pressure of the high pressure tank 3a, 3b from rising over a certain value due to elevated temperature.

Next, the filling line 5 and the supplying line 4 of the high pressure gas supplying system 1 will be described.

As shown in FIG. 2, the filling line 5 includes a connecting section 24 for connecting with a non-shown supply source and a filling piping line 25 connected to the connecting section 24. The filling piping line 25 is divided at the piping branch section 26 into filling piping lines 27 and 28 connected to the high pressure tanks 3a, 3b, respectively. The connecting section 24 is provided with a check valve 29 so as to prevent an insertion of the air and the like into the filling line 5.

The supplying line 4 includes supply piping lines 30 and 31 respectively connected to the corresponding supply opening 9 of each high pressure tank 3a, 3b, and a piping joint section 32 for connecting these two supply piping lines 30 and 31. After connecting these supply piping lines 30 and 31 at the piping joint section 32, the supplying line 4 is connected to the fuel cell 2 shown in FIG. 1 by the supply piping line 33. A check valve 34a as a counterflow preventing section is provided in the supply piping line 30 before the joint of the piping joint section 32 The check valve 34a is positioned in a direction such that the high pressure gas flows in the supply piping line 30 only when the internal pressure of the high pressure tank 3a becomes higher than the pressure at the piping joint section 32. Likewise the supply piping line 30, a check valve 34b as a counterflow preventing section is provided in the supply piping line 31. The check valve 34b is positioned in a direction such that the high pressure gas flows in the supply piping line 31 only when the internal pressure of the high pressure tank 3b becomes higher than the pressure at the piping joint section 32. Therefore, because of these check valves 34a, 34b, it is possible to prevent a counterflow of the high pressure gas from the piping joint section 32 to the inside of the high pressure tanks 3a, 3b.

Next, the process of filling the high pressure gas utilizing the high pressure gas supplying system 1 will be described.

When the internal pressure(s) of one of the high pressure tanks 3a, 3b or both of the high pressure tanks 3a, 3b becomes lower than a certain pressure value, a warning lamp provided at the instrument panel of the vehicle is lit. The driver then refills the high pressure tanks 3a, 3b at a high pressure gas supply station. In this event, a connecting section 24 of the high pressure gas supplying system 1 is connected to a supply source in the high pressure gas supply station by a known method.

And a supply valve of the supply source is released, and the high pressure gas is introduced to the filling line 5 of the high pressure gas supplying system 1. When doing so, since the pressure of the supply source is sufficiently higher than the pressure of the high pressure tanks 3a, 3b (for example, the target filling pressure of the high pressure tank 3a, 3b is 25 Mpa and the pressure of the supply source is 50 Mpa), the check valve 13 provided within the plug 7 of each high pressure tank 3a, 3b is urged toward the inside of the high pressure tank 3a, 3b. Therefore, the filling opening 8 of the plug 7 communicates and the high pressure gas flows from the filling line 5 into the high pressure tanks 3a, 3b, thereby starting the refilling of the high pressure gas.

When the internal pressure of each high pressure tank 3a, 3b becomes a certain value (for example 25 Mpa), the pressure difference between the internal pressure of the high pressure tank 3a, 3b and the pressure of the supply source becomes smaller. The valve element 14 of the check valve 13 is then returned to the original position by the spring 15, and the filling opening 8 is closed by the valve element 14. When releasing the connection between the supply source and the high pressure gas supplying system 1, refilling the high pressure gas into the high pressure tanks 3a, 3b is completed.

When doing so, the pressure within the high pressure tanks 3a, 3b is retained by the check valve 13 at the plug 7. Even if there is a difference in the internal pressure between the high pressure tanks 3a and 3b before starting the filling operation, say the internal pressure of the high pressure tank 3a is 15 Mpa and the internal pressure of the high pressure tank 3b is 10 Mpa, since the check valve 13 of each plug 7 operates independently, the high pressure gas is filled until the internal pressure of the respective high pressure tanks 3a, 3b becomes a certain value (for example 25 Mpa).

Further, the explanation will be made as to the instance where the high pressure gas is supplied from the high pressure tanks 3a, 3b to the fuel cell 2.

When the high pressure gas is supplied only from the high pressure tank 3a, the shutoff valve 18 of the high pressure tank 3a is opened after receiving a signal from a non-shown control device. In this event, since the pressure at the piping joint section 32 in the supplying line 4 is sufficiently lower than the internal pressure of the high pressure tank 3a, the valve element 35 of the check valve 34a provided in the supply piping line 30 is urged from the position illustrated in FIG. 2 to the position illustrated in FIG. 3 by the high pressure gas supplied from the high pressure tank 3, ensuring a flowing passage in the check valve 34a. Therefore, the high pressure gas within the high pressure tank 3 flows in the direction shown by the arrow of FIG. 3, and further to the fuel cell 2 via the piping joint section 32 and the supply piping line 33. The high pressure gas also flows from the piping joint section 32 to the supply piping line 31. However, since the check valve 34b of the supply piping line 31 does not establish a flowing passage notwithstanding that the pressure at the piping joint section 32 becomes higher, the high pressure gas supplied from the high pressure tank 3a does not counterflow into the high pressure tank 3b.

Meanwhile, supplying the high pressure gas only from the high pressure tank 3b is carried out by the similar manner as described above, and a counterflow of the high pressure gas from the high pressure tank 3b into the high pressure tank 3a can be prevented by the check valve 34a. This means that the check valve 34a, 34b of the high pressure tank 3a, 3b with higher internal pressure always opens, while the check valve 34b, 34a of the high pressure tank 3b, 3a with lower internal pressure always closes. As the result, even if both shutoff valves 17 of the respective high pressure tanks 3a, 3b are opened simultaneously, the high pressure gas does not counterflow from either one of the high pressure tanks 3a, 3b into the other high pressure tank 3a, 3b. Further, when the internal pressures of the high pressure tank 3a and the high pressure tank 3b are almost the same, both check valves 34a, 34b may be open simultaneously. However, a problem does not arise since the internal pressures are substantially the same and a counterflow of the high pressure gas does not occur.

According to the high pressure gas supplying system 1, even if there is a pressure difference between the two high pressure tanks 3a, 3b upon filling or supplying the high pressure gas, it is possible to prevent a counterflow of the high pressure gas from the high pressure tank 3a, 3b with higher internal pressure to the high pressure tank 3b, 3a with lower internal pressure through the supplying line 4. Therefore, it Is possible to prevent the high pressure tank 3 from rising to a high temperature because of the pyretogenesis derived from rapid counterflow of the high pressure gas. As shown in FIGS. 2 and 3, the check valves 34a, 34b are provided in the supply piping lines 30 and 31, respectively. However, the check valves 34a, 34b maybe embedded in the respective plugs 7.

Figure 4:
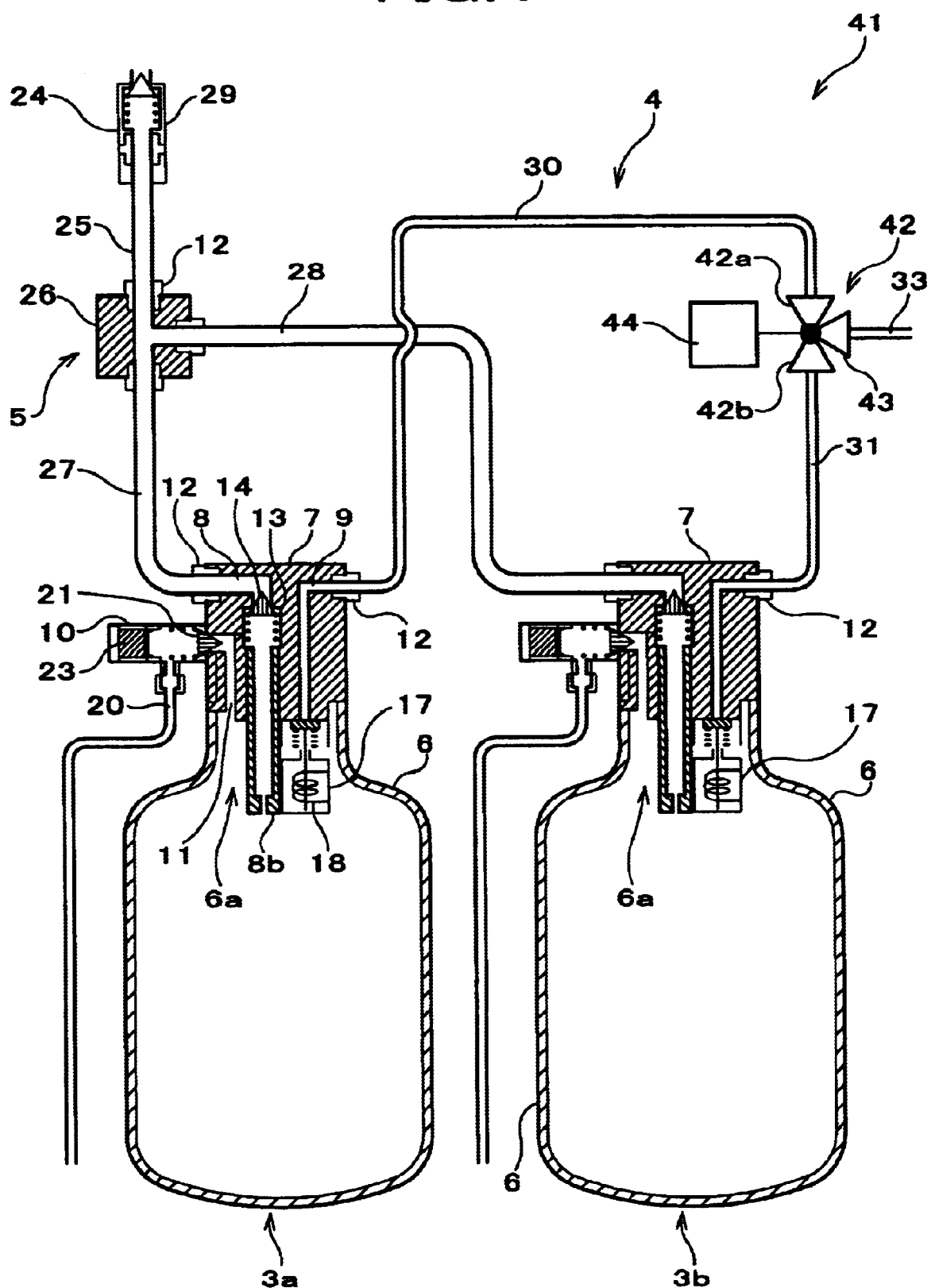
FIG. 4 illustrates a structure of another embodiment of a high pressure gas supplying system according to the present invention.

With reference to FIG. 4, another embodiment of a high pressure gas supplying system according to the present invention will be described. Parts or elements similar to those previously described with reference to FIG. 2 will be denoted by the same reference numerals and the description thereof will be omitted.

As shown in FIG. 4, the high pressure gas supplying system 41 comprises two high pressure tanks 3a, 3b, a filling line 5 for filling the high pressure tanks 3a, 3b with high pressure gas, and a supplying line 4 for supplying the high pressure gas from the high pressure tanks 3a, 3b to the fuel cell 2. Likewise the aforementioned embodiment, the high pressure gas supplying system 41 is provided with non-shown pressure gauges for the purpose of monitoring the pressure of the high pressure gas.

The supplying line 4 includes two supply piping lines 30, 31 connected to a supply opening 9 of each high pressure tank 3a, 3b. and a supply piping line 33 for supplying the fuel cell 2 with the high pressure gas. And at the piping joint section connecting these supply piping lines 30, 31 and 33, a three way valve 42 is provided for communicating either the supply piping line 30 or the supply piping line 31 with the supply piping line 33.

The three way valve 42 includes a port 42a connected with the supply piping line 30, a port 42b connected with the supply piping line 31, and a port 43 connected with the supply piping line 33. The three way valve 42 is constructed such that a connection is selectively established between the port 42a (supply piping line 30) and the port 43 (supply piping line 33) or between the port 42b (supply piping line 31) and the port 43 (supply piping line 33) when an actuator 44 moves the valve element.

In this high pressure gas supplying system 41, switching the three way valve 42 makes either one of the high pressure tanks 3a, 3b supply the fuel cell 2 with the high pressure gas. Therefore, when a connection is made between the supply piping line 30 and the supply piping line 33 upon switching the three way valve 42, since the supply piping line 31 shut of from these supply piping lines 30 and 33, the high pressure gas does not flow into the supply piping line 31, thereby preventing a counterflow of the high pressure gas.

Also, when a connection is made between the supply piping line 31 and the supply piping line 33 upon switching the three way valve 42, since the supply piping line 30 is shut off from these supply piping lines 31 and 33, the high pressure gas does not flow into the supply piping line 30, thereby preventing a counterflow of the high pressure gas. As described above, the three way valve 42 constitutes a counterflow preventing section as recited in the claims.

While the present invention has been described in detail and with reference to specific embodiments thereof, it will be apparent to one skilled in the art that various changes and modifications can be made therein without departing from the spirit and scope of the appended claims.

For example, the counterflow preventing section may be constituted by the check valves 34a, 4b provided in the supply piping lines 30 and 31 of FIG. 2 and the three way valve 42 of FIG. 4

Further, the counterflow preventing section may be constituted by an electromagnetically-operated shutoff valve provided between the piping joint section 32 and the supply piping line 30 and between the piping joint section 32 and the supply piping line 31 such that either one of the high pressure tanks 3a, 3b is selected for supplying the high pressure gas by way of switching open/close of these shutoff valves.

Further, in the high pressure gas supplying system 41, a plurality of three way valves 42 may be arranged in series or in parallel so as to control the high pressure gas supplying system including more than three high pressure tanks 3a.

Moreover, in order to control the pressure of the high pressure gas to be supplied to the fuel cell 2, a pressure reducing valve is preferably provided in the high pressure gas supplying system 1, 41. The pressure reducing valve is preferably provided in the supply piping line 33, however, it may be provided for each high pressure tank 3a, 3b.

What is claimed is:

1. A high pressure gas supplying system including;
   a plurality of high pressure tanks for filling high pressure gas;
   a supplying line for supplying the high pressure gas from the high pressure tanks; and
   a switch valve for controlling open/close of each high pressure tank,
   wherein said supplying line comprises a plurality of supply piping lines each connected to said high pressure tank, a piping joint section connecting these supply piping lines, and a counterflow preventing section for preventing a counterflow of the high pressure gas from said piping joint section to each high pressure tank.

2. A high pressure gas supplying system according to claim 1, wherein said counterflow preventing section is formed by a check valve provided either between the piping joint section and each high pressure tank or at each high pressure tank.

3. A high pressure gas supplying system according to claim 1, wherein said counter flow preventing section is formed by a three way valve provided at the piping joint section.

* * * * *